(12) United States Patent
Meor

(10) Patent No.: US 10,356,241 B2
(45) Date of Patent: Jul. 16, 2019

(54) 911 TRAINING SYSTEM

(71) Applicant: Nathan Meor, Florissant, MO (US)

(72) Inventor: Nathan Meor, Florissant, MO (US)

( * ) Notice: Subject to any disclaimer, the term of this patent is extended or adjusted under 35 U.S.C. 154(b) by 28 days.

(21) Appl. No.: 15/658,686

(22) Filed: Jul. 25, 2017

(65) Prior Publication Data
US 2018/0034963 A1 Feb. 1, 2018

Related U.S. Application Data

(60) Provisional application No. 62/367,073, filed on Jul. 26, 2016.

(51) Int. Cl.
H04M 3/51 (2006.01)
G09B 19/00 (2006.01)
G09B 9/00 (2006.01)
H04M 7/00 (2006.01)
G09B 5/06 (2006.01)
H04W 84/12 (2009.01)

(52) U.S. Cl.
CPC ............. H04M 3/5116 (2013.01); G09B 5/06 (2013.01); G09B 9/00 (2013.01); G09B 19/00 (2013.01); H04M 7/006 (2013.01); H04M 2203/403 (2013.01); H04W 84/12 (2013.01)

(58) Field of Classification Search
None
See application file for complete search history.

(56) References Cited

U.S. PATENT DOCUMENTS

| 7,420,963 B1* | 9/2008 | Shankar | H04L 12/66 370/352 |
| 2011/0153798 A1* | 6/2011 | Groenendaal | H04L 63/20 709/223 |
| 2013/0185351 A1* | 7/2013 | Lee | H04L 67/42 709/203 |
| 2015/0355715 A1* | 12/2015 | Smith | G06F 3/017 715/863 |

* cited by examiner

Primary Examiner — Ayaz R Sheikh
Assistant Examiner — Sori A Aga
(74) Attorney, Agent, or Firm — Douglas E. Warren

(57) ABSTRACT

A system is disclosed of use as a 911 training system that can be used to train individuals how to use a cell phone to make a 911 phone call to an emergency call center network by having a student make a simulated, but realistic, phone call to a simulated emergency call center and having the student perform the steps needed to have the emergency call center direct first response personnel and equipment to an emergency situation.

14 Claims, 2 Drawing Sheets

911 TRAINING SYSTEM

CROSS REFERENCE TO RELATED APPLICATIONS

This application claims priority to U.S. Provisional Application No. 62/367,073 filed on Jul. 26, 2016 and the entire disclosure of that provisional application is incorporated by reference is if fully stated herein.

STATEMENT REGARDING FEDERALLY SPONSORED RESEARCH

Not Applicable.

BACKGROUND OF THE INVENTION

In the past, almost every home in the United States had a desk or wall type analog telephone that was connected to hard wiring in a building that was in turn connected by wires to regional and national telephone systems. The fast-paced development of more and more sophisticated telephonic communication devices in the past few years, however, has resulted in the virtually discontinued use of any analog desk or wall phone by individuals and even some larger business. The most prevalent telephone instrument in personal use today is a cellular telephone, and more specifically, a highly complex computer-based digital cellular telephone.

During the time that the older analog telephones were used, police and fire departments across the United States generated an emergency calling system that could be used quickly to notify local quick-response authorities that an emergency existed within the jurisdiction of those authorities. That emergency system was built around the use of a single three digit phone number that connected the caller directly to an emergency answering system that could send emergency personnel and vehicles to the site of the emergency. This system became know as the "911 Emergency System."

Everyone needs to learn how to dial 911 in an emergency situation. Use of the analog phones was relatively simple and direct. The proliferation of smart phones and the operating systems in use by those smart phones, however, make 911 emergency calls using those smart phones more problematic. This can be particularly true for children who have not yet learned the intricacies of smart phone operation. In contrast, children who only know smart phones can find the use of an essentially obsolete analog phone to be confusing. Those same children may have an excellent understanding of video games and other computerized entertainment devices.

It would be desirable to have a 911 training system that would be easily and readily used to teach people, including children, how to use a smart phone to dial and use the 911 emergency calling systems.

SUMMARY OF THE INVENTION

This section provides a general summary of the disclosure, and is not a comprehensive disclosure of its full scope or all of its features. Embodiments of the present 911 Training System provide a closed loop 911 simulation system for training individuals how to make a proper 911 emergency telephone call. The System is intended to be used to educate children and adults, and to train potential 911 dispatchers in how to dial 911 in an emergency and to respond to those 911 emergency calls.

The present invention can perform as a 911 Training System that can be used by adults and children to instruct them in the process of using a smart phone to contact a 911 emergency network. Various embodiments of the present invention provide methods of making 911 emergency calls exactly as they would be made in a real life emergency situation, but without the call actually entering the 911 emergency network. This is to say, users of the system can make a 911 call on the smart phone and answer questions or provide the critical information that would be needed in a real emergency situation without generating an actual 911 emergency call.

In accordance with the various embodiments of the present invention, this invention relates to a 911 Training System to teach people and children how to use a cell phone to contact the 911 emergency systems.

DESCRIPTION OF THE DRAWINGS

In the accompanying drawings which form part of the specification.

Corresponding reference numerals indicate corresponding steps or parts throughout the several figures of the drawings.

Figure 1:
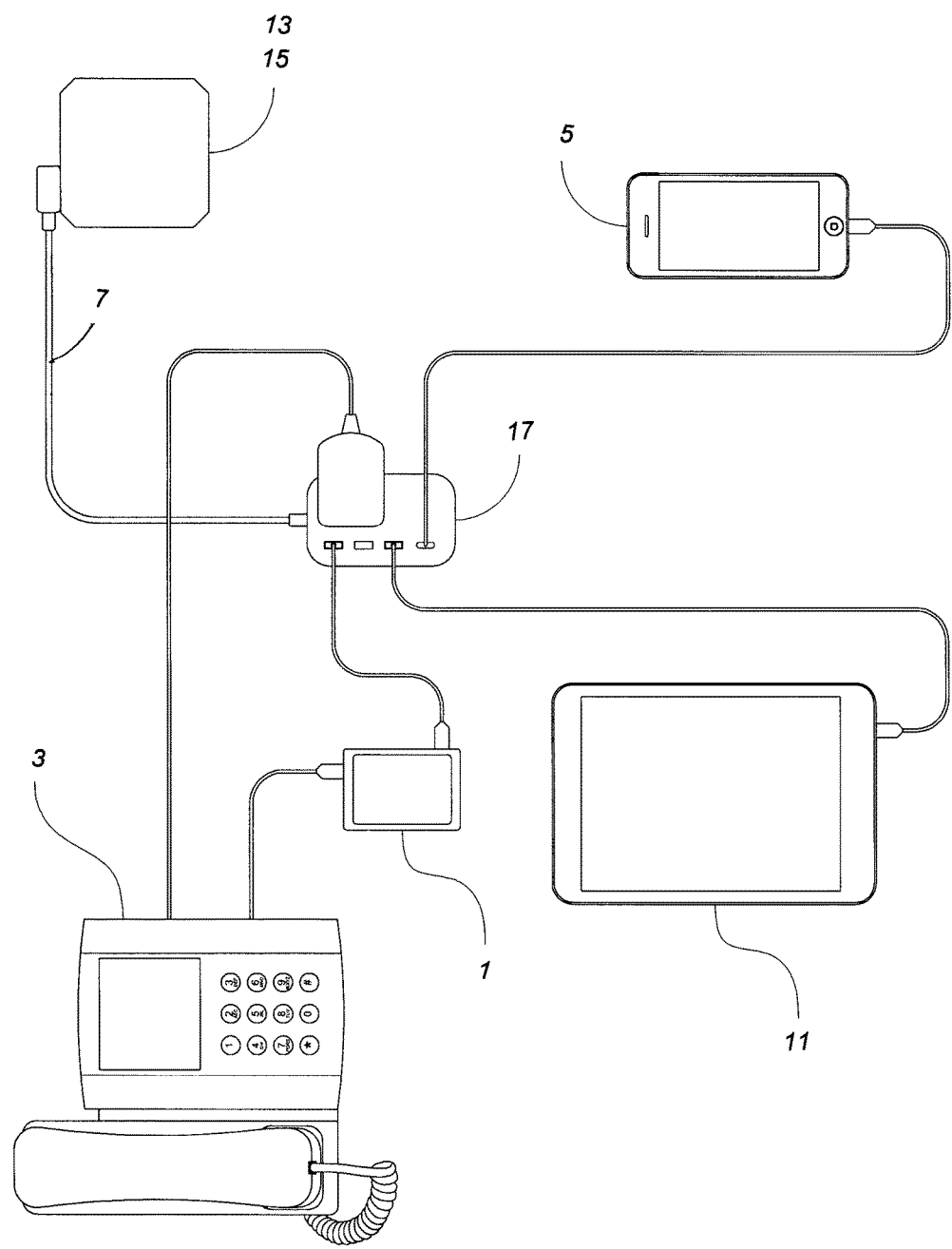
FIG. 1 is a diagram of one embodiment of the present invention.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

Embodiments of the present invention bring the technology age to the process of teaching children how to properly make a 911 emergency telephone call. In some preferred embodiments, the 911 Training System utilizes skills that many children have in using a smart phone and apply those skills as parting a method of teaching children how to make those 911 calls. In a preferred embodiment of the present invention various components are operatively interconnected to transmit and receive signals and communications in a substantially closed-loop system to generate a controlled environment wherein essentially every step is executed in the same manner as if an actual 911 emergency call is being made, but without that call ever leaving the closed-loop system of embodiments of the present invention. This permits the trainee making the 911 call and the instructor acting as the 911 dispatcher to be trained in true lifelike situations with the fear of an actual response by first responders.

At least one preferred embodiment of the present invention is illustrated in the drawings and figures contained within this specification. More specifically, certain preferred embodiments of the present invention are generally disclosed and described in FIGS. 1-3.

Figure 2:
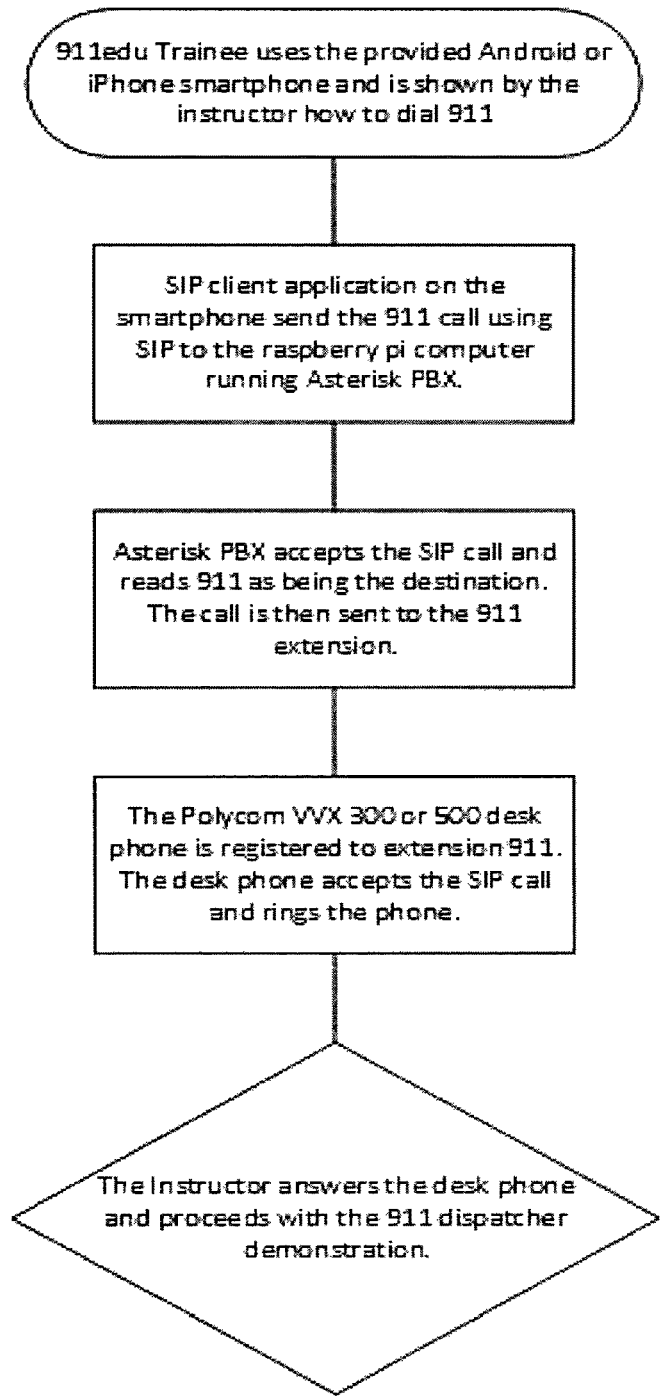
FIG. 2 is a flow chart showing the operational flow during the use of one embodiment of the present invention.

Referring now to FIGS. 1-3, one embodiment of the present invention of a 911 Training System is shown. Embodiments of the 911 Training System comprise a computer 1, a VoIP digital desk phone 3, a smart phone 5, interconnection cables 7, and a power and communication distribution hub 17. The components are operationally configured to allow communications between those components.

In present embodiment, the computer 1 is a raspberry pi computer that comprises a small single-board computer originally developed to promote the teaching of basic computer science in schools and in developing countries. Here, the computer 1 can include a Broadcom system on a chip (SoC), which includes an ARM compatible central processing unit (CPU) and an on-chip graphics processing unit (GPU, a VideoCore IV). The CPU speed can range from between about 700 MHz and about 1.2 GHz, and can have an on board memory range from between about 256 MB to about 1 GB RAM. In alternative embodiments, a Secure Digital (SD) card is used to store the operating system and program memory 13 in either the SDHC or MicroSDHC sizes. The computer has between one and four USB slots, HDMI and composite video output, and a 3.5 mm phono jack for audio. The computer 1 in the present embodiment also has an Ethernet port and on board Wi-Fi 802.11n and Bluetooth operational capabilities.

Also in the present embodiment, the VoIP digital desk phone 3 is Polycom VVX 300 or 500 VoIP digital desk phone digital desk phone. It will be appreciated by those of skill in the art that other desk phones may also be used as long as the VoIP digital desk phone selected is digital, has VoIP capability and the proper connection ports available to interconnect and communicate with the other elements of the 911 Training System as disclosed herein. The computer 1 is operationally interconnected to the proper communication port of the digital desk phone 3. In the present embodiment, the computer is a raspberry pi computer, however, once again it is understood that other computers may be used and remain within the intended scope of the present embodiment as long as the computer used functions as disclosed in the present embodiments. The computer 1 is connected to the VoIP digital desk phone with a standard Ethernet cable 7. The smart phone 5 is in communicatively connected to the computer 1 through the use of a wireless WiFi connection. In alternative embodiments the 911 Training System also includes a television upon which the screen of the smart phone 5 can be displayed and used as an instructional tool.

The smart phone 5 can be of any type similar to an Apple iPhone or an Android. It is understood, however, that the smart phone 5 can be any WiFi enabled device that has a microphone and a speaker. For example, any Apple iPhones, Apple Tablets, Apple Laptops or Desktops, any Android phones or tables may alternatively be used. In alternative embodiments, a Windows desktop and laptop computer, or a linux/unix based desktop and laptop computer can also be used with the understanding that special softphone SIP client software would need to be installed on some or all of those alternative devices and configured for the 911 Training System as described herein.

The computer operating system 13 used in the current embodiment is a Linux OS with a PBX application identified by the trade name ASTERISK. It is understood that the VoIP digital desk phone 3 registers with ASTERISK system using the SIP. The computer 1 is also equipped with additional software to allow the computer to function as a wireless access point. In this embodiment, the wireless software used is identified by the trade name HOSTAPD. The smart phone 5 is placed in wireless communication through the use of a smart phone application that is an SIP client that is configured to permit the smart phone to register with the ASTERISK software installed in the computer 1. This configuration of hardware and software permits the smart phone to connect to the computer 1 via WiFi and thus allow the smart phone user to dial 911 from smart phone that is acting as the SIP to the computer, and allow the smart phone 911 call to be routed to the VoIP digital desk phone 3.

It is noted that in the current embodiment of the invention, the entire set of operating systems 13 needed for this embodiment to function properly is stored on a SD micro card. It is understood that prior to the operation of this embodiment of the 911 Training System, the SD micro card is inserted into an SD port of the computer 1. The computer 1 is powered up and verified for proper system booting. The VoIP digital desk phone is plugged into the computer and the necessary templates or configurations are installed into the VoIP digital desk phone. It will be appreciated that in certain embodiments, the proper settings for all of the set of operating systems 13 uploaded to the VoIP digital desk phone can be previously set. The VoIP digital desk phone is rebooted to ensure all systems are operating properly.

The Ethernet cable 7 is installed into the Ethernet port of the computer 1 and into the LAN port on the VoIP digital desk phone. The smart phone 5 is then reconfigured to the specific smart phone being installed into the System and the smart phone home screen is cleared of all images and other pages of the smart phone. The SIP client application is then downloaded to the VoIP digital desk phone and configured for the smart phone's PBX account. The fully assembled System can then be tested by placement of a 911 test call by the smart phone to ensure the call is received by the VoIP digital desk phone and to ensure that audio will be heard by the smart phone and the VoIP digital desk phone.

It is understood that there can be various alternative embodiments for the preferred embodiments noted herein. For example, in one embodiment, the 911 Training System can be packaged and sold as a turnkey system where all of the hardware and software has been configured and installed into a fully operational training system. In alternative embodiments, the 911 Training System can reside as a software package that can be sold separately on any type of computer readable storage device that can then be installed and configured on hardware selected by an end user. In yet another alternative embodiment, the 911 Training System can also include a requirement for the end user to communicate to a base server that will finish the installation and configuration of the hardware selected by an end user wherein the communication may include connecting by Internet to a specific URL that will identify the particular hardware selected by the end user and then upload the proper templates, configurations, or other software needed to successfully assemble the hardware and software to become the 911 Training System.

In certain alternative embodiments, a recording device can be incorporated into the system such that recordings made by the recording system can be played back and analyzed by the trainee and the instructor using the 911 Training System.

In yet other embodiments, the 911 Training System can be used as a portable unit by the addition of necessary battery packs and/or portable power supplies that allow the 911 Training System to operate without being fixed to a certain position because of power connections to a wall outlet or other fixed power source.

Referring now to FIG. 2, the flow chart therein shows the operational flow during the use of one embodiment of the present invention. When the smart phone is used to dial a 911 emergency call, the SIP client sends the call to the computer using WiFi to the ASTERISK PBX application. The PBX application routes that call to extension or ring group 911. The VoIP digital desk phone which was registered to extension or a part of ring group 911, will receive and accept the 911 call made by the smart phone and the VoIP digital desk phone will ring. This connection allows the user of the smart phone 5 to have a conversation with the trainer acting as a 911 dispatcher and permit the caller and the person acting as the dispatcher to work together to understand how the 911 emergency network works and what communication and information need to occur to ensure proper first response to an emergency situation.

In alternative embodiments, the 911 Training System can include a short message service (SMS) function. This embodiment further comprises a smaller electronic computer system normally identified as a "tablet" 11. The tablet 11 is a mobile computer with a touchscreen display, electronic circuitry, and a rechargeable electrical battery 15 within a single computing device that is usually disposed within a single thin, flat package. The touchscreen display uses gestures by finger or stylus and can be used to replace the mouse, trackpad, and keyboard used with desktop computers and laptops.

In the current embodiment, the tablet 11 is operationally connected by WI-FI to the computer 1. In other alternate embodiments, the tablet 11 can be connected to the computer with wires or cables.

In the operation of this embodiment, a caller uses the smart phone 5 to send an SMS message containing the word "HELP" to the a VoIP digital desk phone 3. The simulated dispatcher receives the SMS message from the smart phone 3 on the tablet 11 and sends a response SMS message to the smart phone 5 to provide the smart phone caller the necessary information for get an emergency response from the simulated dispatcher. When the emergency caller using the smart phone 5 receives the SMS message from the tablet 11, the caller then communicates as necessary with the simulated dispatcher by sending and receiving messages from the tablet 11.

It will be appreciated by those of skill in the art that the SMS messaging process in the current embodiment utilizes the XMPP protocol. This mimics the normal SMS function by relaying the messages through the XMPP server that's running on the raspberry pi computer 1. The smart phone 5 and tablet 11 use XMPP client to mimic an SMS texting APP that allow those devices to communicate back and forth via the XMPP protocol.

It is noted that certain of the above embodiments describe a 911 Training System that include all of the hardware and software components needed to assemble and operate that particular version of the 911 Training System. It will be appreciated that yet other alternative embodiments of the present invention can include the software only, or the software and only some or all of the hardware components. For example, in one alternative embodiment, the present invention resides in a digital computer storage device such as a hard disk drive, a floppy disk drive, a flash drive, and SD micro card or other similar computer readable storage device upon which all of the software needed for this alternative embodiment of the 911 Training System has been stored. In that embodiment, the digital computer storage device can be incorporated into the computer element of a hardware system and then the software on that digital computer storage device can self-load as needed onto each of the hardware components as noted in the above descriptions to result in an operational 911 Training System that is intended to be within the scope of the claims of this or any other related patent application.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A 911 training system comprising:
   a VoIP digital desk phone;
   a training system computer operationally connected to the VoIP digital desk phone;
   a smart phone operationally connected to training system computer wherein the smart phone is operationally reconfigured to the specific smart phone being installed into the 911 training system and a home screen of the smart phone home is cleared of all images and other pages of the smart phone;
   a television adapter wirelessly connected to the smart phone to display the smart phone images on a television screen;
   an operating system that operationally connects 911 calls from the smart phone to the VoIP digital desk phone, wherein the operating system allows installation of operationally necessary templates into the VoIP digital desk phone when it is connected to the training system computer, and wherein the operating system downloads an SIP client application onto the VoIP digital desk phone which then configured to communicate a PBX account of the PBX application installed on the smart phone; and
   a downloadable set of software systems permit the dialing of 911 on the smart phone to enter a closed-loop system that intercepts the 911 call and routes the 911 call to the VoIP digital desk phone.

2. The 911 training system of claim 1 wherein the operating system is a Linux OS based operating system having a PBX application.

3. The 911 training system of claim 2 wherein the training system computer is equipped with additional software to allow the training system computer to function as a wireless access point.

4. The 911 training system of claim 3 wherein the smart phone is placed in wireless communication through the use of a smart phone application that is an SIP client configured to permit the smart phone to register with the PBX application.

5. The 911 training system of claim 4 wherein the operating system is stored on a SD micro card wherein prior to the operation of 911 training system the SD micro card is inserted into an SD port of the training system computer for installation of the operating system into the training system computer.

6. The 911 training system of claim 4 wherein the operating system is stored on at least one of either a hard disk drive, a floppy disk drive, a flash drive, or a digital training system computer readable storage device upon which all of the software needed for the 911 Training System has been stored.

7. The 911 training system of claim 4 wherein the SIP client sends the smart phone call to the training system computer using WiFi to the PBX application when the smart phone makes a 911 call, wherein the PBX application routes that 911 call from the smart phone to one of either an extension or ring group 911 that has been assigned to the VoIP digital desk phone, wherein VoIP digital desk phone will receive and accept the 911 call made by the caller using the smart phone to allow a caller using the smart phone to have a conversation with a simulated 911 dispatcher using the VoIP digital desk phone such that the caller and the simulated 911 dispatcher work together to understand how a 911 emergency network works and what information is needed from the caller to ensure a proper first response to an emergency situation.

8. The 911 training system of claim 7 further comprising an SMS system incorporated into the 911 training system wherein the SMS system comprises a tablet computer system having a touchscreen display and an electronic circuitry, wherein the tablet computer system is operationally connected to the training system computer by one of either a WI-FI connection or a cable connection.

9. The 911 training system of claim 8 wherein an SMS message sent by a caller using the smart phone is communicated to the simulated 911 dispatcher using the VoIP digital desk phone, wherein the simulated 911 dispatcher receives the SMS message that is then displayed on the tablet and the simulated 911 dispatcher sends a response SMS message to the caller to provide the caller with the necessary information for get an emergency response to be initiated by simulated 911 dispatcher.

10. The 911 training system of claim 9 wherein the SMS system comprises an XMPP protocol to mimic a normal SMS function by relaying the messages through an XMPP server operating on the training system computer and wherein the smart phone and the tablet use an XMPP client function to mimic an SMS texting APP thereby allowing the smart phone and the tablet to communicate.

11. The 911 training system of claim 10 further comprising a rechargeable battery system to allow for stand alone operation of the 911 training system.

12. The 911 training system of claim 11 further comprising a recording device can be incorporated into the system such that recordings made by the recording system can be played back and analyzed by the trainee and the instructor using the 911 Training System.

13. The 911 training system of claim 12 wherein the training system computer is a raspberry pi ARM compatible central processing unit and an on-chip graphics processing unit computer that comprises a Broadcom system on a chip having an ARM compatible central processing unit and a graphics processing unit.

14. The 911 training system of claim 13 wherein the training system computer includes a pi ARM compatible central processing unit has a central processing unit CPU of between about 700 MHz and about 1.2 GHz, wherein the training system computer comprises an on board memory range from between about 256 MB RAM to about 1 GB RAM, wherein the training system computer comprises between one and four USB slots, HDMI and composite video output, a 3.5 mm phono jack for audio, and an Ethernet port with on board Wi-Fi 802.11n and Bluetooth operational capabilities.

* * * * *